United States Patent
Ho et al.

(10) Patent No.: US 9,002,935 B1
(45) Date of Patent: Apr. 7, 2015

(54) COPYING DOCUMENT CONTENT THROUGH A HOSTED SYSTEM

(75) Inventors: Ronald Ho, Fremont, CA (US); Farzad Khosrowshahi, Pleasantville, NY (US)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 13/101,027

(22) Filed: May 4, 2011

Related U.S. Application Data

(60) Provisional application No. 61/331,345, filed on May 4, 2010.

(51) Int. Cl.
*G06F 15/16* (2006.01)
*G06F 17/30* (2006.01)

(52) U.S. Cl.
CPC ................ *G06F 17/30967* (2013.01)

(58) Field of Classification Search
CPC ..... G06F 17/24; G06F 17/2247; G06F 17/30; G06F 17/3089; G06F 17/30902; H04L 29/06; H04L 67/18; H04L 67/2852; Y10S 70/959
USPC ........................... 709/204, 238; 715/234, 724
See application file for complete search history.

(56) References Cited

U.S. PATENT DOCUMENTS

| | | | |
|---|---|---|---|
| 6,061,686 A * | 5/2000 | Gauvin et al. ................ | 707/624 |
| 2002/0156803 A1 | 10/2002 | Maslov et al. | |
| 2002/0188631 A1 | 12/2002 | Tiemann et al. | |
| 2003/0208541 A1 | 11/2003 | Musa | |
| 2004/0088374 A1 | 5/2004 | Webb et al. | |
| 2004/0139397 A1 * | 7/2004 | Yuan et al. .................... | 715/517 |
| 2005/0193143 A1 * | 9/2005 | Meyers et al. ................ | 709/238 |
| 2006/0129627 A1 | 6/2006 | Phillips et al. | |
| 2008/0010372 A1 | 1/2008 | Khedouri et al. | |
| 2008/0155058 A1 | 6/2008 | Prasad et al. | |
| 2008/0162557 A1 * | 7/2008 | Boda et al. ................ | 707/104.1 |
| 2008/0180736 A1 * | 7/2008 | Lech et al. ................ | 358/1.15 |
| 2008/0301560 A1 * | 12/2008 | Rogers et al. ................ | 715/724 |
| 2009/0070306 A1 | 3/2009 | Stroe et al. | |
| 2009/0089293 A1 | 4/2009 | Garritano et al. | |
| 2009/0323099 A1 * | 12/2009 | Zhan ............................ | 358/1.15 |
| 2011/0191397 A1 * | 8/2011 | Dazzi et al. ................... | 707/827 |

* cited by examiner

*Primary Examiner* — Thuong Nguyen
(74) *Attorney, Agent, or Firm* — Ropes & Gray LLP

(57) ABSTRACT

A computer-implemented method of sharing data between computer applications includes receiving, at a server system from a remote computing device, an identification of a first composite document that is arranged to encapsulate a plurality of distinct sub-documents; receiving at the server system an indication of a user intent to copy one of the sub-documents to a second composite document; identifying one or more composite documents stored on the server system to which a user associated with the remote computing device has access; receiving an indication of a user selection of a second composite document from among the one or more composite documents; and causing the indicated one of the sub-documents to be copied to the second composite document.

17 Claims, 5 Drawing Sheets

COPYING DOCUMENT CONTENT THROUGH A HOSTED SYSTEM

CROSS-REFERENCE TO RELATED APPLICATIONS

This application claims priority to U.S. Provisional Application Ser. No. 61/331,345, filed on May 4, 2010, entitled "Copying Document Content Through a Hosted System," the entire contents of which are hereby incorporated by reference.

TECHNICAL FIELD

This document describes techniques and systems for sharing data between applications in hosted server-based service.

BACKGROUND

Hosted computing services—also known as cloud computing services—are services made available to the public over the internet by third parties, where applications are executed from servers and the results of such execution are presented to users, typically through web browsers. Hosted computer services provide to a wide range of users a variety of solutions, such as mapping, internet search, productivity applications (word processing, spreadsheet, presentation, and e-mail), personal finance packages, enterprise resource management, and many other services. Such applications can be made richer by using techniques such as asynchronous JavaScript and XML (AJAX).

Similar applications have traditionally been provided directly from local computers, like desktop computers. Operating systems on such desktop computers may thus permit the execution of native applications and the execution of applications using code and/or data from hosted services. Modern operating systems also generally permit for "cut-and-paste" operations so that data may be moved from a first location to a second location, including between two different applications. In certain instances, the formatting of the data can also be preserved via translation from a first application to a second application on the computing device. In addition, active links may be maintained between instances of data in computer applications using features such as Dynamic Data Exchange (DDE) or Object Linking and Embedding (OLE). The sharing of data between applications is frequently implemented using a clipboard paradigm, whereby data is cut or copied from a first application onto a clipboard, from which it may later be accessed for pasting into other applications.

SUMMARY

This document describes techniques by which data may be shared using a clipboard paradigm in hosted computing applications. In particular, composite documents, which are frequently experienced as workbooks that contain multiple sheets of spreadsheets, may have portions copied to other composite documents that are stored by a public hosted computer system. For example, a user may be registered and logged into a hosted computer system and may open a file dialog box to see a number of workbooks for which he or she has access privileges assigned by the system (e.g., via access control lists that may be populated based on users who are identified as administrators or creators of particular documents). The user may then tab between distinct worksheets that may be in the selected workbook. In addition, the user may include cross-references between different ones of the individual sheets, such as by adding a formula on sheet1 that references a value in a cell on sheet2.

At some point in time, the user may decide that he or she wants to copy a particular sheet to a new workbook. For example, the user may maintain financial records for multiple companies who are clients of the user, and may prepare a workbook for each company that includes sheets for tracking various business data for the particular company. One of the sheets may reflect purchasing activity by the company, while another may reflect pay information, and yet another may reflect cash flow for the particular company. The user may contract to track particular information for each company, and may thus implement only a sub-set of all the available sheets for particular companies—i.e., the user may set up a modular arrangement of sheets that are arranged in per-client workbooks. And thus, the user may from time-to-time want to copy a sheet from one workbook to another, such as when the user is first establishing a workbook for a new client.

As described more fully below, the user may do so by bringing focus to the source sheet and making a menu selection to copy the source sheet. The user's device may then pass information about the user's actions to a server system that stores workbooks for the user (and for co-workers or other acquaintances of the user who may need to access and edit the documents in the workbooks). The server system may identify the user and pass back a list of workbooks to which the user has access in the system. The user's device may then display the list to the user, and the user may select a target workbook to which the user wishes to copy the sheet. Such a selection may be communicated to the server system, and the server system may modify a model for the target workbook so that content for the selected sheet is copied into the target workbook.

Such sharing of content via a server-based system may also occur across multiple computing sessions and different computers. For example, a user may copy a sheet into a workbook even if that target workbook is not currently being used by the user or any other user, as the copying simply affects a server-stored copy of the workbook model. The same user may access the target workbook immediately (e.g., by the server system passing a link to the target workbook to the user's computer as soon as the user copies the sheet) or later, such as from a different computer (e.g., at their home computer or at an internet café). Alternatively, or in addition, other users may access the target workbook in an ordinary manner.

The items being copied may be full sub-documents such as spreadsheets or word processing documents. Also, portions of such documents may be copied, such as a sub-range of cells on a worksheet, or a passage in a word processing document. For example, before choosing to perform a copying operation, a user may highlight a range of cells within a worksheet, and when the user chooses to perform a copy, the cells in the selected range may be created as a new sheet in a target notebook that is identified by the user.

Such techniques may, in certain implementations, provide one or more advantages. For example, data that is copied across the cloud may be passed between different client devices, whether those devices are associated with the user who initially provided the data, or with other users. Also, the data may be copied to a workbook even if the workbook is not currently opened on any user's machine, since the workbook is stored as a data structure on the central server system. Thus, data may be shared easily between and among multiple different users, where the appropriate users have permitted such sharing. Also, large amounts of data may be stored, even where a client device would not otherwise be able to store the information. Thus, multiple different large sets of data may be stored as distinct workbooks, or sub-documents within workbooks, even when it would be impractical to manage so much content on a client device. Moreover, sharing of data may be provided as easily in cloud-based applications as for traditional desktop applications, and with the additional benefits mentioned here as well.

In one implementation, a computer-implemented method of sharing data between computer applications is disclosed that comprises receiving, at a server system from a remote computing device, an identification of a first composite document that is arranged to encapsulate a plurality of distinct sub-documents; receiving at the server system an indication of a user intent to copy one of the sub-documents to a second composite document; identifying one or more composite documents stored on the server system to which a user associated with the remote computing device has access; receiving an indication of a user selection of a second composite document from among the one or more composite documents; and causing the indicated one of the sub-documents to be copied to the second composite document.

The composite document can comprise a workbook, and the sub-documents comprise spreadsheet sheets. Also, the sub-documents can further comprise one or more word processing pages. Receiving the identification of the first composite document can comprise receiving a user request to serve the first composite document to the remote computing device for editing of the first composite document on the computing device. In addition, identifying one or more documents to which the user has access can comprise analyzing a document-directed access control list that associates particular registered users of a public server system with particular documents based on whether the particular registered users are authorized to access the particular documents.

In certain aspects, the method further comprises serving to the remote computing device a control that, when selected by a user of the remote computing device, causes the second composite document to be automatically served for display and manipulation on the remote computing device. The method can also include maintaining absolute references in the indicated one of the sub-documents to other sub-documents in the first composite document, after causing the indicated one of the sub-documents to be copied to the second composite document. In addition, the method can include serving to the remote computing device information that indicates locations in the indicated one of the sub-documents in which references to other sub-documents may have been broken. The method can also include transforming references in the indicated one of the sub-documents to other sub-documents in the first composite document, so as to aim the references to sub-documents in the second composite document.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which users of a hosted computing service or system may copy-and-paste, or otherwise share, pieces of content between different documents, including between documents in two different types of computer applications. The applications may be served into container documents that are presented on browsers that execute on a one or more users' client computing devices (e.g., personal computers, netbooks, and smart phones), using techniques such as Asynchronous JavaScript and XML (AJAX) in familiar manners. Such serving may be managed by application servers at a hosted service. The content may be managed by clipboard servers at the service, where those servers are separate from the application servers, and from servers that manage and coordinate notebook content. The servers may communicate with child elements (e.g., sub-documents) that are contained in the container documents (e.g., workbooks). Each container document and child element may operate by separately executing JavaScript or similar code, and the child element may communicate with the container document to show information about items in the child document, and to provide for cross-referencing from one child element to another within the same parent document, or between two different parent documents.

Figure 1:
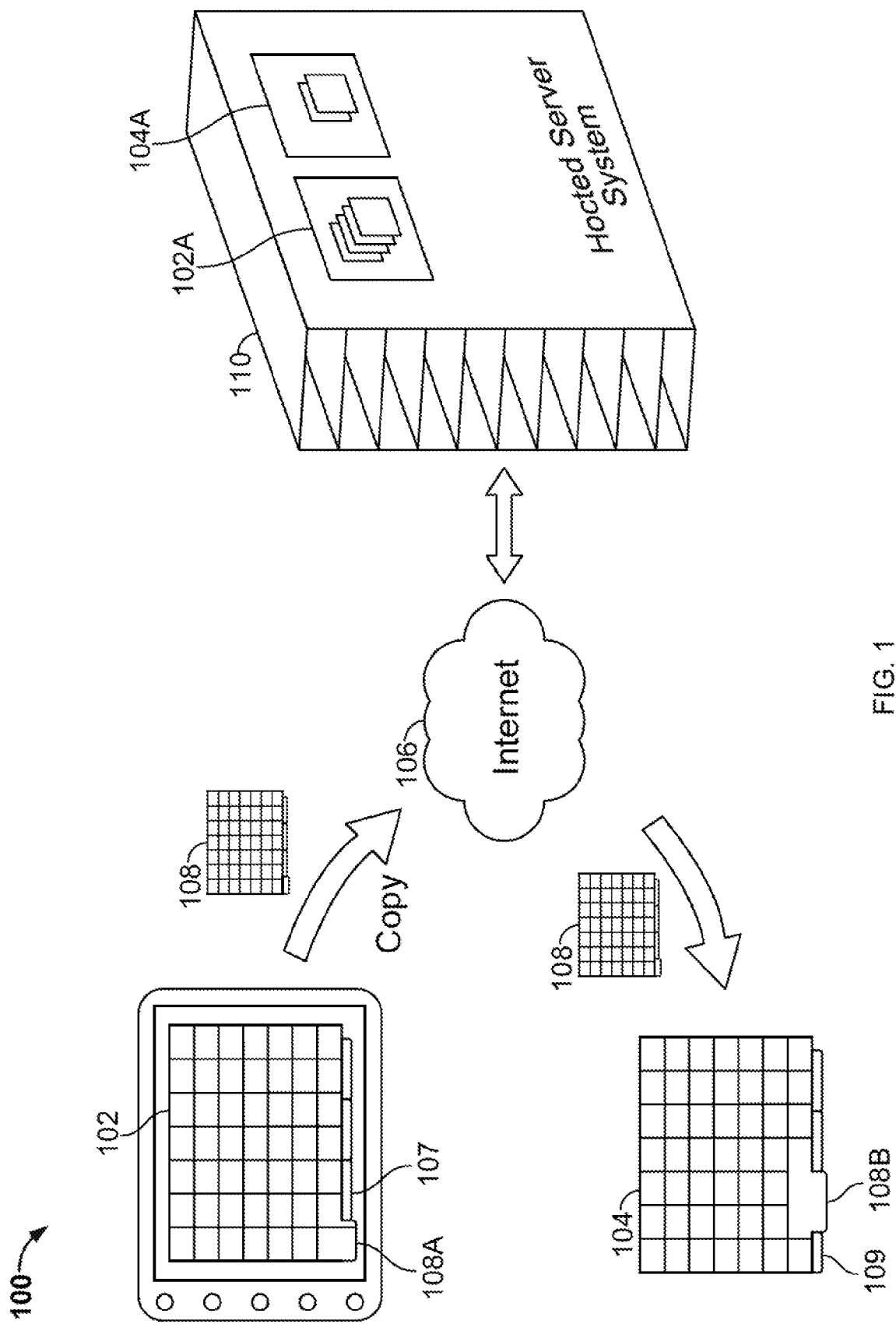
FIG. 1 is a conceptual diagram of a hosted system providing functionality to copy sub-documents into different composite documents over the internet.

FIG. 1 is a conceptual diagram of a hosted system 100 providing functionality to copy sub-documents into different composite documents over the internet. The system 100 is shown here as involving two spreadsheet workbooks 102, 104 that have shared a common piece of content in the form of a sheet 108, that has been copied through the internet 106, and using a hosted server system 110, from one workbook 102 to the other 108. The workbooks 102, 104 each include a plurality of sheets, which are displayed in a visual, stacked-tab arrangement. For example, workbook 102 includes sheets 108A and 107. Workbook 102 is shown as being displayed on a tablet computing device here so as to indicate that a user is currently accessing the workbook 102 and displaying it.

To distinguish different versions of the worksheet here, the generalized version of the sheet is represented as sheet 108, while particular copies of the worksheet are represented as sheet 108A in the source workbook 102, and as sheet 108B in a target workbook 104. The target workbook 104 is shown floating in free space here to indicate that it is not currently open on any particular user's device, but is instead simply being stored and updated as a data structure of a hosted server system 110.

The process shown here involves copying the sheet 108 from its form as sheet 108A to its form as sheet 108B through the internet and the hosted server system 110. Although the copying is shown conceptually here as passing from one client device to another through the internet, such copying could generally occur by the server system 110 making copies of the sheet content and associating the original and the copy with particular workbook identifying numbers in the system 110. In other words, a model of workbook 104 may be updated based on the copying operation, apart from whether a representation of the workbook 104 has yet to be requested by any other user of the system 100. When the information is passed to the clients, it may simply reflect the models of the workbooks that are stored and managed on the server system 110, and changes to the workbooks may be reflected simply by passing change data form one of the clients up to the server system 110 and then executing, on the server system 110, commands to bring about the desired changes.

In this example, the copies of the sheet 108A, 108B can be displayed as web-based child documents in workbook container documents in the presentation pane of a web browser. Each instance of a container document may have initially been loaded when a user chose to execute a web-based application, such as a spreadsheet application in this example. JavaScript or other similar code may have been accessed from mark-up code that was loaded by the user's browser so as to cause the application to be displayed in the user's browser, in cooperation with web servers and application servers at the hosted server system 110. Additional code may have been loaded, and may have been or may be, executed to provide hosted sub-document copying functionality for the user, which is further described below. The servers of the server system 110 may be generally application-independent, in that they can receive content from, and provide content to, a variety of different applications, and can also translate the content as necessary when it is moved between two different applications. The servers may, for example, include the ability to execute applications in various virtual machines, so that a particular server in the server system 110 need not be dedicated to a particular user, a particular application, or even to a particular session.

A user interacting with workbook 102 may use the system 100 in ways similar to a user accessing workbook 104 (when workbook 104 is being accessed by someone). In fact, the same user may access both workbooks, either at different times on the same device, in different sessions (either at different times or simultaneously), or from different client devices. The coordination between such different modes of access for a user may occur using credentials (e.g., user ID and password) that the user provides when logging onto the hosted computer system 110. Such credentials may be managed via a credentialing or authentication sub-system (not shown) and the sub-systems discussed herein may receive user ID information from client devices, provide it to the credentialing sub-system, and be told whether the user (or the client device) corresponds to a particular user account, so that the system 100 will provide content to the client device when it is requested. Such tracking of devices against a user account, and approval of devices to receive information tied to the user account, can occur in various manners and is well-known in the art.

In the figure, the hosted computer system 110 is shown as storing two items, 102A and 104A which are copies that correspond to the workbooks being shown as associated with particular client computing device. The particular items may be stored separately from each other and may be accessed by the clipboard using unique item IDs. Items 102A and 104A may more particularly be models of the relevant corresponding documents, and versions of those documents that are displayed on client devices may be subsets of those models that are served, upon request to particular client devices. For example, model 102A may be an extremely large set of spreadsheets, while workbook 102 may represent a smaller sub-set of that larger spreadsheet. Workbook 102 may also change over time, such as by fetching different portions of the mode at item 102A as a user pans around in a spreadsheet.

Each item (e.g., a workbook model) may also have associated with it a list of users, or more particularly, a list of user accounts, that may access it by pasting it into a document. For example, the user who initially adds the item to a clipboard may identify individual users (e.g., by email addresses, other user IDs, or other such mechanisms), by group (e.g., all members in the user's contacts list, or all such users tagged as "family" or "co-workers" or the like), all users from a particular domain (e.g., another quick way to identify co-workers in a corporate environment), or all users (e.g., by indicating that the item should be made public). When an item is copied to a new workbook or other similar location, and other users are identified for the item, they may be provided with a notice (e.g., via email message) that the item has been made available to them (e.g., via a menu selection when they are logged into the system 110) and they may be shown a name for the item when they access a menu when they are interacting with an application supplied by the system 110.

Thus, using the system 100, one or more users may conveniently take content from a document (e.g., workbook) in a first application or a first instance of an application, and may easily share it, through the cloud, with another application, another instance of the same application, or with other users. The content may maintain its various formatting and other meta data, or users may choose to paste the content without use of formatting, just as they can do for desktop-based clipboards.

In the manners discussed here, then, mechanisms are provided by which users of cloud-based applications such as spreadsheet and word processing applications (which may be native applications or may run in a browser) may cause a defined sub-section of a document, such as a sheet or chapter in a workbook, to be copied to another model in the cloud. The sub-section may be pre-defined before the user begins working with it, so that a user may select it from among other available predefined sub-sections, such as by selecting one sheet in a workbook from among multiple different sheets in the workbook. The selected sheet may then be automatically deposited into a workbook that the user selects, such as from a list of workbooks that the system identifies as being available to the user. The user who performed the process may then access the moved or copied sheet in the same session from the same device, or in a different simultaneous or later separate session from the same device or another device. Also, other users who have access to the target model may also see the copied or moved content. In this way, user can quickly move content between different document models that are stored in a hosted service.

Figure 2:
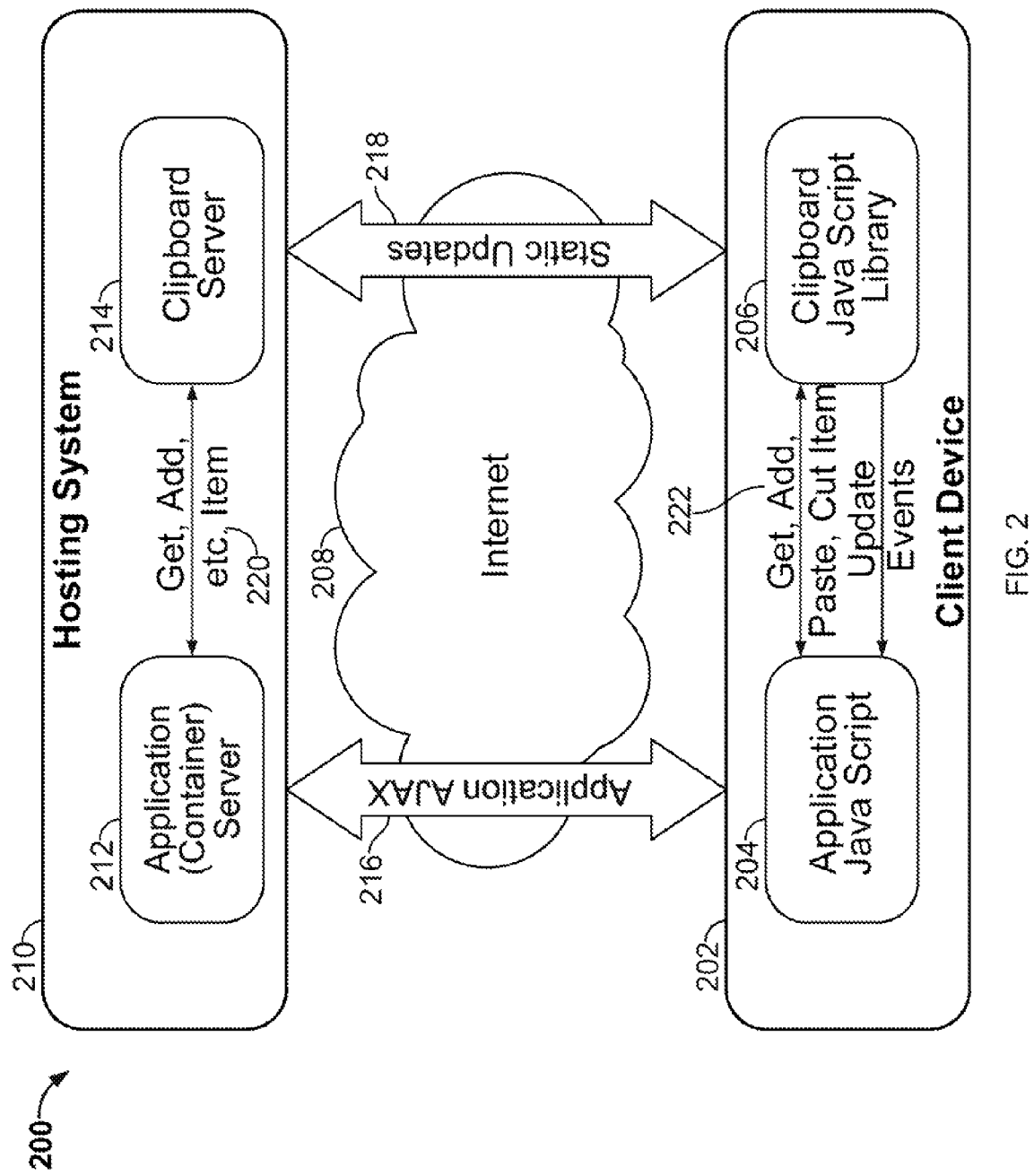
FIG. 2 is a schematic diagram of components in a hosted clipboard system that may integrate and/or complement sub-document copying.

FIG. 2 is a schematic diagram of components in a hosted clipboard system 200 that may integrate and/or complement sub-document copying, like that described above. In general, the system 200 uses a two-part server system 210 to communicate with a two-part client system that mirrors, to a large part, the server system 210. The system 200 shown here may be used to provide cloud-based clipboard functionality to a user of a hosted computer system, and may also be supplemented so as to provide for simplified copying of a sub-document from a source parent document to a target parent document. The sub-document may be predefined, e.g., a worksheet in a workbook document, as opposed to first being defined by the user at the time or moving or copying (e.g., by the user highlighting, with a mouse or other pointer, a group of text in a document).

More specifically, in this example, an application server sub-system 212 that is part of the server system, 210 communications with application JavaScript or similar executable code running on a web browser on a client device 202. The application server sub-system 212 is responsible for providing information for presenting an application by which a user can interact in a complete way with a document, such as a spreadsheet or word processing document. Such interaction may include adding typed information and images, formatting (e.g., changing fonts, font sizes, underlining, italics, and the like), alignment, page formatting, and other typical operations. A clipboard server sub-system 214 that is also part of the server system 210 interacts with a clipboard JavaScript library 206 and receives content from documents on which users are working, and provides such information back to the same or different documents, in a familiar cut/copy-and-paste clipboard user interaction. The sub-systems 212, 214 on the hosting server system 210 may communicate with each other, such as via remote procedure calls 220, as needed to coordinate the sharing of information and to maintain security and authentication for the receipt of information. Likewise, the components on the client device 202 may communicate 222 so as to, for example, pass content to be copied from a container document that is executing application JavaScript 204, to clipboard JavaScript, which may in turn forward the content to the clipboard server 214.

Communication between the application server sub-system 212 and the application JavaScript 204, on the one hand, and between the clipboard server sub-system 214 and the clipboard JavaScript library 206, may occur through one or more networks that include the internet 208. For example, application AJAX 216 may be passed from the application server sub-system 212 when a page is loaded by a browser on the client device 202. The JavaScript may then be executed and may causes further communications to occur between the server system 210 and the client device 202, and between the application JavaScript 204 and the clipboard JavaScript library 206 on the client device 202.

In a similar manner, static updates 218 may be passed between the clipboard server 214 and the clipboard JavaScript library 206 via the internet 208. Such updates may occur when a user of the client device 202 adds content to a clipboard or tries to obtain content from a clipboard, which may result in the content (or pointers to the content) being passed automatically in the proper direction, and in a model of a document stored at the server system 210 being updated. For example, a user may make menu selections to have a particular worksheet copied from a first workbook to a second workbook. Such a process may have the effect of the server system 210 identifying a portion of the first workbook in its stored model of the workbook, and copying data structures for that first portion into another model for the second workbook. Particular meta data may also be copied over, and additional meta data may be created for the second workbook. For example, information may be created for naming a tab for a sheet in the target, second workbook.

Figure 3:
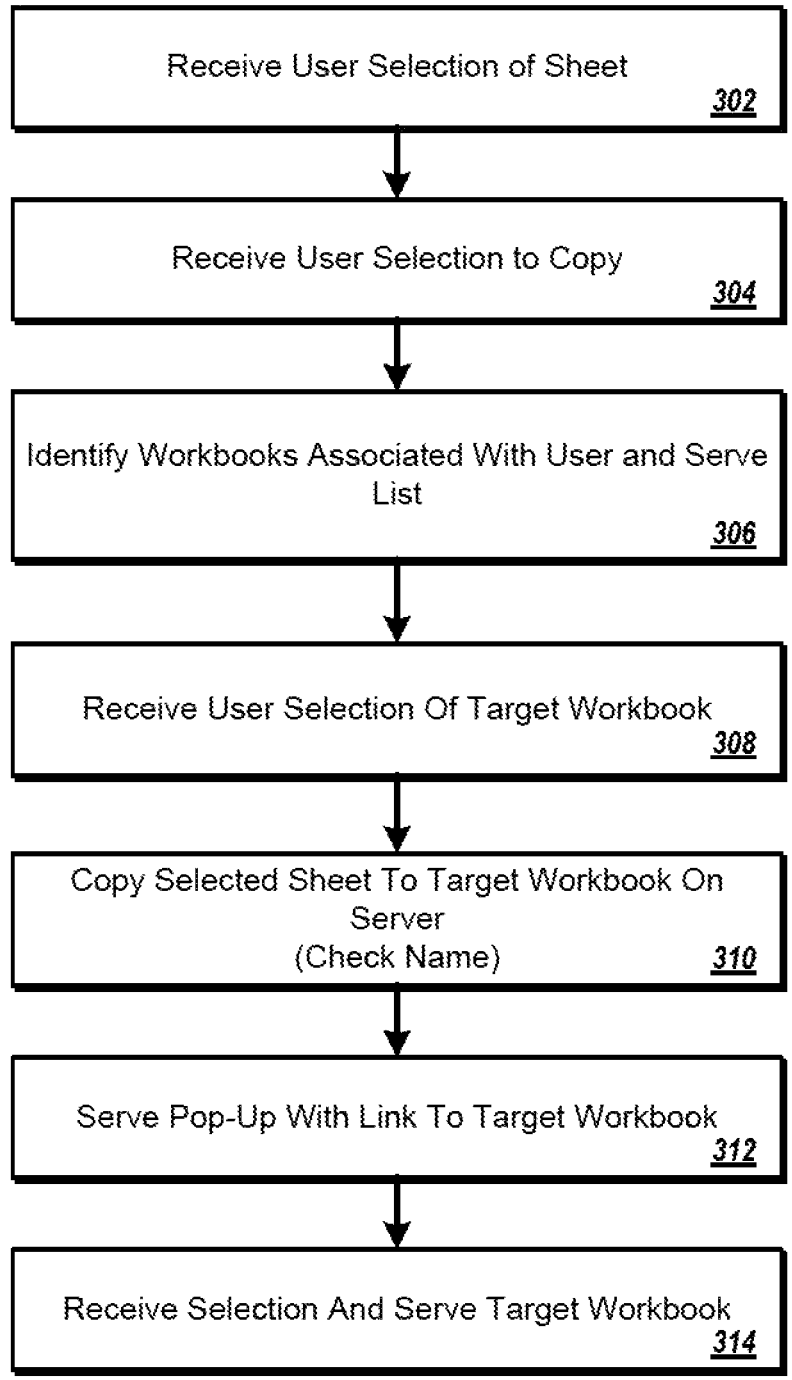
FIG. 3 is a flowchart showing a process for sharing content between applications in a hosted service.

FIG. 3 is a flowchart showing a process for sharing content between applications in a hosted service. In general, the process describes actions that a hosted server system may take in interacting with a remote computer user who is editing various documents, and who wants to share content between the documents. The sharing may involve adding a sub-document that is currently in one document, to another document that the user selects.

The process begins at box 302, where a user selection of a sheet in a browser-based spreadsheet application is received. For example, the user may interact with a standard "file open" dialogue box to select a workbook in which the sheet is located and then may click on a visual display of a tab that is associated with the sheet in order to bring the particular sheet into focus in the open workbook (in distinction to other sheets that are in the notebook). The workbooks and sheets that are made available may depend on the user's ID submitted in a log in process, and on an access control list for each document that defines what registered users are allowed to access the document. For example, when the user invokes a menu to show workbooks that are available to her, the system may check access control lists to locate an ID for the user, and may then display names of such workbooks to the user, for selection by the user.

At box 304, the process receives a user selection to copy the active sheet. In a default setting, such a selection may be interpreted as a user intent to copy the entire sheet. However, the user may show an intent to copy a portion of the sheet or an item on the sheet (e.g., an image, graph or other such object) by highlighting (e.g., with a mouse) the portion of interest. At box 306, the process identifies workbooks that are associated with the user, and may serve to the client device for the user a list of names of such documents. In short, the user here has indicated that she wants to copy content from the source document to a target document, so the process may identify the documents to which the user has authorized access.

At box 308, a user selection of one of the identified workbooks (or other types of documents) is received by the process. Such a selection may be as simple as the user clicking on one of the documents in a list of candidate documents that was displayed to the user. At box 310, the process copies the selected sheet from the source document to the target document. Such copying may involve a number of checks or transformations to address the fact that other sheets in the target document may be different than other sheets on the source document. For example, the sheet name may be checked, and may be modified if the target document already has a sheet of that name (e.g., the label "(2)" may be added at the end of the name of the coped sheet in the target document).

Also, cross-references between the copied sheet and other sheets may be left alone or changed during the copying process. For example, the labels for formulas in cells of a spreadsheet may be left in their literal form even if that causes the formulas to break. Also, the formulas may be changed so that they continue to the other sheets in the source document (which prevents the links from breaking, but may be confusing for a user of the target document down the road)—in other words, the formulas in the target document may aim at the source document after the operation.

Also, attempts may be made to identify sheets in the target document that substantially match sheets in the source document, and the cross-references may be amended to adjust so that they point at such matching sheets. For example, if the source document includes two sheets and the target document includes one sheet, an analysis may be performed to determine whether the sheet in the target document matches the non-copied sheet in the source document, and if it does, the copied document may have its cross-references aimed at the first sheet in the target workbook, in a manner that corresponds to how they were aimed at the first sheet in the source workbook. As one example for determining whether sheets in the source and target workbooks match or correspond to each other, the process may determine whether textual labels in the two sheets match each other at equivalent locations in the sheets, or whether formulas match each other. A degree of match may also be identified, and a "match" determination may be made only if the degree of match figure exceeds a threshold value.

Where cross-references may be affected by a copying operation like that discussed here, the user may be warned. For example, cells in a sheet that have been affected may be highlighted in a particular color so that the user may go in and edit the formulas in such cells and un-break them. Also, all cells that include a cross-reference may be highlighted in this way, or only cells that are determined to have broken references. The application may allow a user to automatically step through the affected cells in order, and identify what changes if any should be made to each cell, before selecting an on screen control to skip to the next affected cross-referencing cell.

At box 312, after the copy has been performed, the process may serve to create on the user's computer a pop-up with a link to the target document. Such serving may occur by preparing mark-up code that may include references to JavaScript code so as to have a box pop-up on the user's web browser be generated. The executed code may include instructions to the user and a URL that points to the target document. At box 314, the process receives a selection so that it serves the target notebook or document to the user's computer. Thus, the user can easily bring up the target document to review how well the copy took effect in the target document, and may then choose to undue the copy, or to edit the content in the target document.

Figure 4:
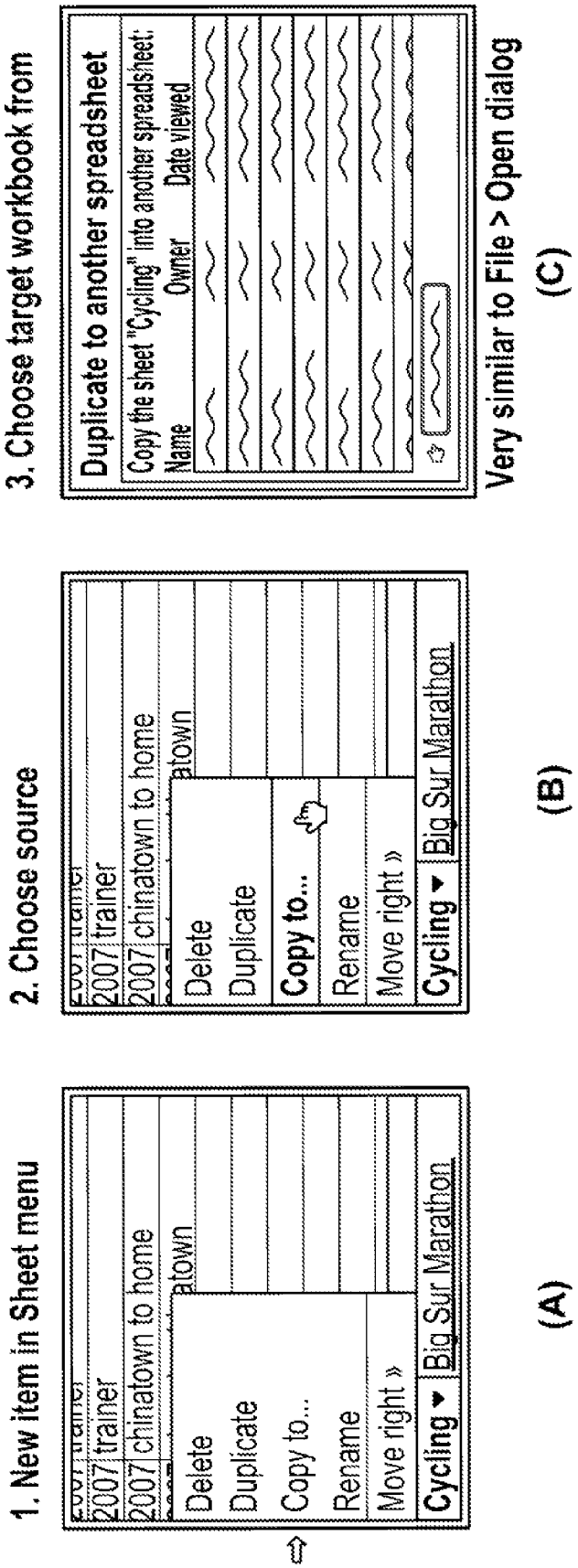
FIG. 4 shows example screen shots of a browser-based spreadsheet application for copying sheets between distinct workbooks.

FIG. 4 shows example screen shots of a browser-based spreadsheet application for copying sheets between distinct workbooks. Screen (a) shows a menu in a GOOGLE SPREADSHEETS application. In the figure, a sheet of a spreadsheet workbook is active, and a user has selected a pop-up menu in the lower-left corner of the application in a web browser. The menu provides a number of selections, include a "Copy to . . . " selection to copy the sheet to another workbook.

Each of the selections in the menu may, when selected by a user of the browser, cause a spreadsheet application to perform certain operations, and to cause a hosted server system to cooperatively perform operations. For example, selection of a "delete" option may cause a worksheet to be deleted or other user-selected content to be deleted.

Screen (b) shows the user selecting the "copy to . . . " option. Such selection may indicate a user intent to copy a worksheet on which the current focus of a browser has been placed. The code that generates the menu may then cause such operations to be initiated.

Screen (c) shows a list of workbooks to which the user has access, and the user in the process of selecting the name of one of the workbooks. The list may be presented in direct response to the user selecting the "copy to . . . " command. Such a selection by the user from one of the workbooks in the list may then cause the current sheet to have its contents copied to the selected workbook, such as by adding a new sheet to that workbook (and more specifically, to a cloud-stored model of the workbook) that matches or substantially matches the active sheet (e.g., where certain modifications are made to the sheet by the system to take into account factors such as cross-references from the sheet to other sheets). The copying of data form one workbook model to another may occur partially or entirely on the server side of a system, so that the copying may occur even if no users have a copy of the target workbook open at the time of the copying operation. Thus, as shown, a relatively simple user interface may be provided by which a user of a web-based application may quickly and conveniently select a predefined sub-portion of a document to be moved or copied to another location, to receive a list of possible target locations and to select a location from the list, and to have the predefined sub-portion automatically copied.

Figure 5:
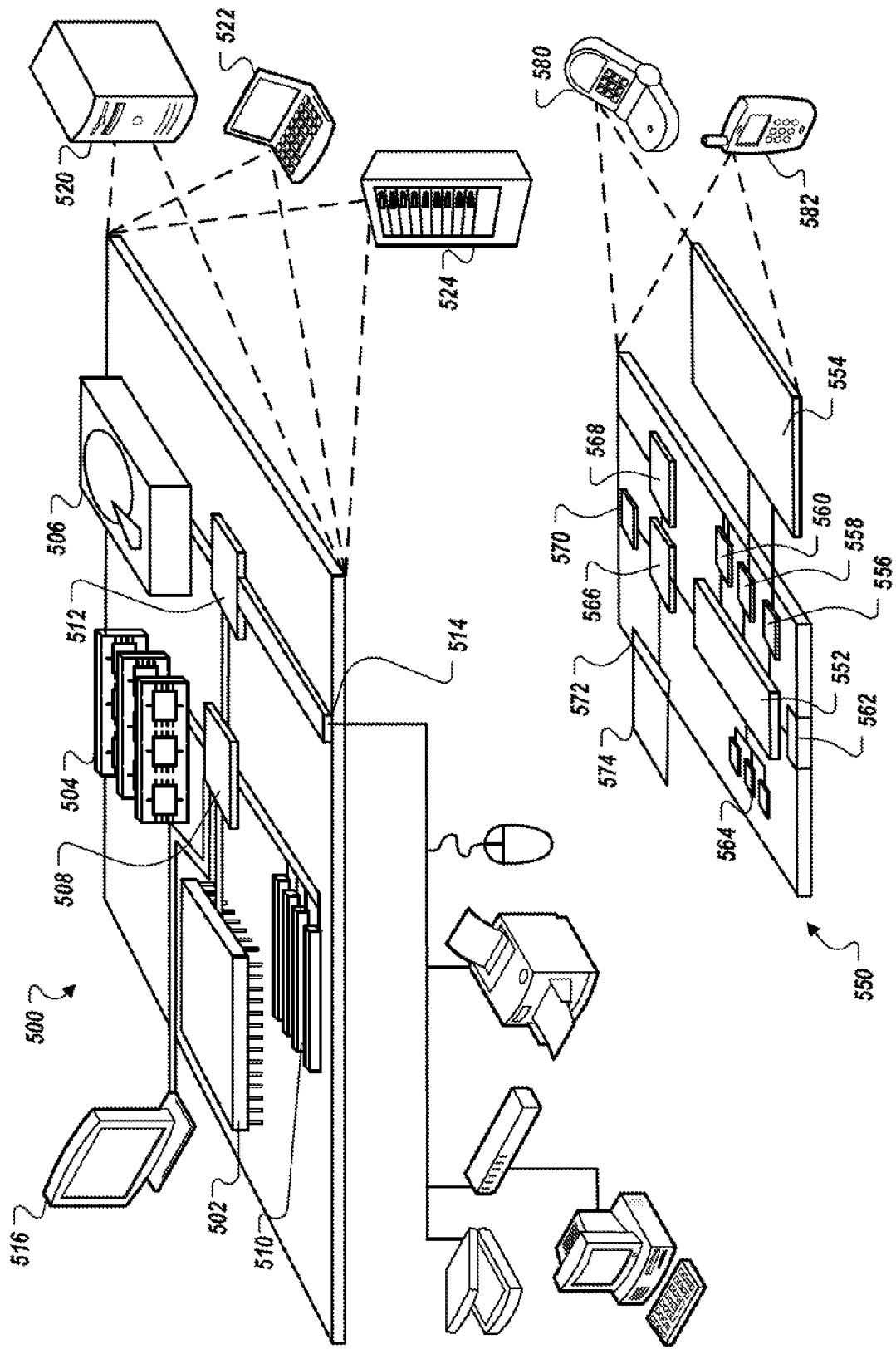
FIG. 5 is a block diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer-implemented method of sharing data between composite documents, the method comprising:
    receiving, at a server system from a remote computing device, an identification of a first composite document, wherein:
        the first composite document comprises a spreadsheet workbook stored as a data structure on the server system, and
        the first composite document contains a plurality of distinct sub-documents, wherein one or more of the sub-documents comprises a worksheet of the spreadsheet workbook;
    receiving at the server system an indication of user intent to copy one of the sub-documents to a second composite document, the indication resulting from a user selection of a name of the one of the sub-documents for copying to the second composite document, wherein the second composite document comprises a spreadsheet workbook stored as a data structure on the server system;
    identifying one or more composite documents stored on the server system to which a user associated with the remote computing device has access;
    receiving an indication of a user selection of the second composite document from among the one or more composite documents; and
    causing the indicated one of the sub-documents to be copied from the first composite document to the second composite document.

2. The method of claim 1, wherein receiving the identification of the first composite document comprises receiving a user request to serve the first composite document to the remote computing device for editing of the first composite document on the computing device.

3. The method of claim 1, wherein identifying one or more documents to which the user has access comprises analyzing a document-directed access control list that associates particular registered users of a public server system with particular documents based on whether the particular registered users are authorized to access the particular documents.

4. The method of claim 1, further comprising serving to the remote computing device a control that, when selected by a user of the remote computing device, causes the second composite document to be automatically served for display and manipulation on the remote computing device.

5. The method of claim 1, further comprising maintaining absolute references in the indicated one of the sub-documents to other sub-documents in the first composite document, after causing the indicated one of the sub-documents to be copied to the second composite document.

6. The method of claim 5, further comprising serving to the remote computing device information that indicates locations in the indicated one of the sub-documents in which references to other sub-documents may have been broken.

7. The method of claim 1, wherein the second composite document is not open on a computer for any user of the system when the indicated one of the sub-documents is copied into it.

8. The method of claim 1, wherein:
    each distinct sub-document of the plurality of distinct sub-documents is a standalone sheet of the first composite document; and
    causing the indicated one of the sub-documents to be copied to the second composite document comprises causing the standalone sheet of the first composite document corresponding to the indicated one of the sub-documents to be copied to the second composite document without the user opening the second composite document.

9. The method of claim 8, wherein each distinct sub-document of the plurality of distinct sub-documents is a spreadsheet sheet of a first workbook comprised in the first composite document, wherein causing the indicated one of the sub-documents to be copied to the second composite document comprises causing the spreadsheet sheet of the first workbook corresponding to the indicated one of the sub-documents to be copied as a new spreadsheet sheet into a second workbook comprised in the second composite document.

10. The method of claim 1, further comprising:
    identifying, at the server, content of the first composite document corresponding to the indicated one of the sub-documents; and
    causing the copying of the identified content from the first composite document to the second composite document.

11. One or more non-transitory computer-readable media having recorded thereon instructions, that when executed by one or more computer processors, perform operations comprising:

receiving an identification of a first composite document, wherein:
- the first composite document comprises a spreadsheet workbook stored as a data structure on the server system, and
- the first composite document contains a plurality of distinct sub-documents, wherein one or more of the sub-documents comprises a worksheet of the spreadsheet workbook;

receiving at the server system an indication of user intent to copy one of the sub-documents to a second composite document, the indication resulting from a user selection of a name of the one of the sub-documents for copying to the second composite document, wherein the second composite document comprises a spreadsheet workbook stored as a data structure on the server system;

identifying one or more composite documents stored on the server system to which a user associated with the remote computing device has access;

receiving an indication of a user selection of the second composite document from among the one or more composite documents; and causing the indicated one of the sub-documents to be copied from the first composite document to the second composite document.

12. The non-transitory recordable media of claim 11, wherein receiving the identification of the first composite document comprises receiving a user request to serve the first composite document to the remote computing device for editing of the first composite document on the computing device.

13. The non-transitory recordable media of claim 11, wherein identifying one or more documents to which the user has access comprises analyzing a document-directed access control list that associates particular registered users of a public server system with particular documents based on whether the particular registered users are authorized to access the particular documents.

14. The non-transitory recordable media of claim 11, wherein the operations further comprise serving to the remote computing device a control that, when selected by a user of the remote computing device, causes the second composite document to be automatically served for display and manipulation on the remote computing device.

15. The non-transitory recordable media of claim 11, wherein the operations further comprise maintaining absolute references in the indicated one of the sub-documents to other sub-documents in the first composite document, after causing the indicated one of the sub-documents to be copied to the second composite document.

16. The non-transitory recordable media of claim 15, wherein the operations further comprise serving to the remote computing device information that indicates locations in the indicated one of the sub-documents in which references to other sub-documents may have been broken.

17. The non-transitory recordable media of claim 11, wherein the operations further comprise transforming references in the indicated one of the sub-documents to other sub-documents in the first composite document, so as to aim the references to sub-documents in the second composite document.

* * * * *